United States Patent [19]
Persson et al.

[11] Patent Number: 5,813,393
[45] Date of Patent: Sep. 29, 1998

[54] OVEN AND METHOD FOR GENERATING HEAT FOR AN OVEN

[75] Inventors: Jonas Persson, Fristad; Lennart Larsson, Sandhult, both of Sweden

[73] Assignee: Sveba-Dahlen AB, Fristad, Sweden

[21] Appl. No.: 839,450

[22] Filed: Apr. 14, 1997

[30] Foreign Application Priority Data

Apr. 22, 1996 [SE] Sweden .................................. 9601610

[51] Int. Cl.[6] .................................................. F24C 15/32
[52] U.S. Cl. ...................................... 126/21 A; 126/273 R
[58] Field of Search ............................... 126/19 R, 21 A, 126/21 R, 273 R; 431/328, 329

[56] References Cited

U.S. PATENT DOCUMENTS

| | | | |
|---|---|---|---|
| 3,485,230 | 12/1969 | Harrington et al. | 431/329 |
| 4,944,283 | 7/1990 | Tsuchiya et al. | |
| 5,222,474 | 6/1993 | Yencha | 126/21 A |

FOREIGN PATENT DOCUMENTS

| | | |
|---|---|---|
| 2222058 | 10/1974 | France . |
| 33 46 019 A1 | 6/1985 | Germany . |
| 36 36 622 A1 | 5/1988 | Germany . |
| 2 074 889 | 11/1981 | United Kingdom . |
| 2 185 420 | 7/1987 | United Kingdom . |

*Primary Examiner*—Carroll B. Dority
*Attorney, Agent, or Firm*—Fasth Law Offices; Rolf Fasth

[57] ABSTRACT

The invention relates to a convection oven for processing food products, preferably, an oven (1) for baking. This is provided with heat-generating devices (4).

According to the invention, the heat-generating device is a catalytic burner (4) that creates at least the main part of the heat, whereby higher efficiency is achieved, less space is needed, controllability is greater, and the process is more environmentally friendly.

The invention also relates to a method for generating oven heat by means of catalytic combustion.

6 Claims, 1 Drawing Sheet

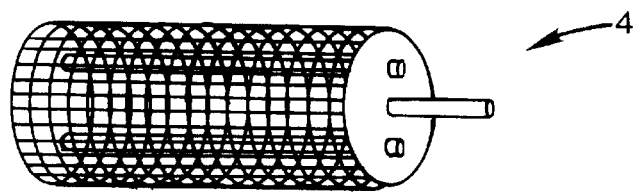
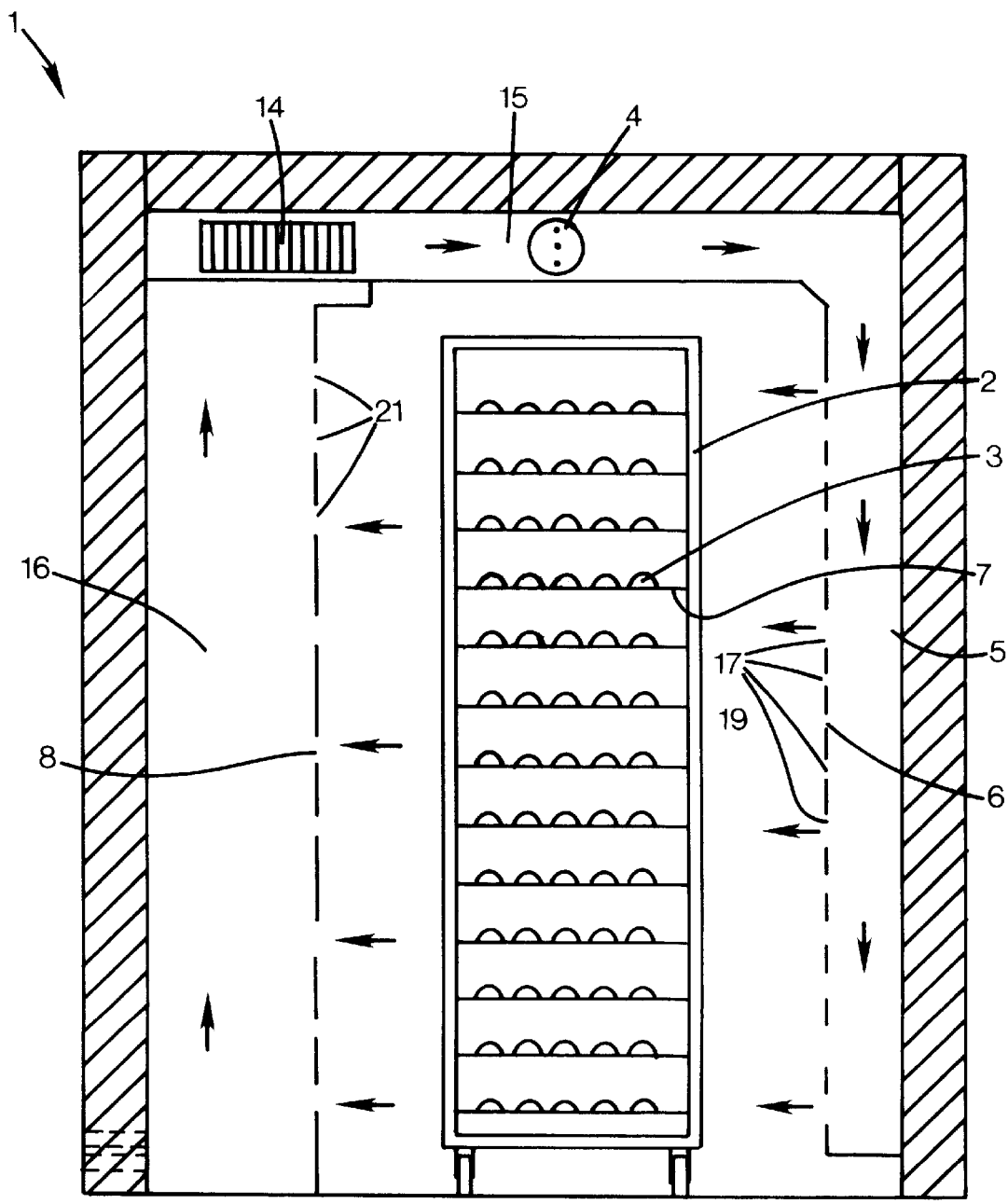

OVEN AND METHOD FOR GENERATING HEAT FOR AN OVEN

The present invention relates to an oven and a method for processing food products.

The invention is intended primarily for baking bread on an industrial scale, but it is not limited to this field of use. It is thus applicable to all other types of processing of food products in ovens. In baking ovens of the type the invention is primarily intended for, heat is generated either electrically, or, more commonly, by means of a burner of a traditional type, which uses oils or gas as fuel, and in which heat is usually applied via a heat exchanger.

Traditional burners have several disadvantages, such as poor efficiency, sluggish control cycles, they require a large space, and they produce polluted exhaust gases.

The problem of polluted exhaust gases can be solved in part by using catalytic post-combustion of the exhaust gases. Such procedures are previously known from, for example, GB 2,185,420; U.S. Pat. No. 4,944,283; DE 3,346,019; and NL 7,005,521, all of which show the arrangement of catalytic post-combustion in the out-going air. In this manner, one avoids spreading a foul smell out into the environment since pollution products such as grease, oil and the like are burned but do not exit along with the out-going air. The problem remains, however, that the exhaust gases from the burner reach the food products, in addition to the other disadvantages of a conventional burner mentioned above. Moreover, FR 2,222,058 discloses an oven in which a catalytic combustion device is used in an oven of the kind that transfers heat by means of radiation, that is, to an oven of a type that differs in principle from a convection oven.

The object of the present invention is to provide a convection oven and a method for generating heat in such an oven, such that these problems are overcome.

By using a catalytic burner it has become possible to significantly increase efficiency compared with a conventional burner. By using a catalytic burner it has become possible to eliminate the need for a heat exchanger, which is used in conventional burners. A catalytic burner thus makes possible a compact system with a small mass. For 100 kW of power, the system will not weigh more than 2 kg, whereas a corresponding heat exchanger weighs roughly 150 kg. By eliminating the large mass that the heat exchanger represents, one also achieves a much faster control cycle. Because of the faster control cycle, it becomes much easier to follow the optimal profile of how the temperature should vary as a function of time. The need for space is also greatly reduced by using a catalytic burner with the aforementioned power. Thanks to the complete combustion of a catalytic burner, the cleanliness of the exhaust gases increases. This allows for greater freedom in the choice of fuel quality.

The result of this is lower operational costs, better performance, a more compact oven and, most importantly, less environmental impact.

In yet another preferred embodiment, the oven air is recirculated, which is advantageous from the standpoint of efficiency, since all of the combustion gases are applied to the oven air. Using current technology, the energy content of the combustion gases is lost out through the exhaust stack. Only the air that is needed for combustion is applied.

The above-mentioned and other advantageous embodiments of the invention are set forth herein.

The invention is described further in the following detailed description of a preferred embodiment of the invention, with reference to the accompanying figures, of which:

FIG. 1 is a schematic sectional view of an oven according to the invention.

FIG. 2 is a perspective view of a catalytic burner used in the oven in FIG. 1.

The oven in FIG. 1 is a convection oven where the air is heated by a heat-generating device 4 which, according to the invention, comprises a catalytic burner. A fan 14 is disposed in a horizontal top channel 15 defined along a top of the oven. The top channel 15 is in fluid communication with a first vertical passageway 5 that is defined along a side of the oven and downstream of the top channel 15. The vertical passageway 5 has a plurality of openings 17 defined in an inner wall 6 so that the vertical passageway 5 is in fluid communication with the bread rack 2 disposed inside a chamber 19 and so that heated air may be discharged into the chamber 19. The heat-generating device 4 is also disposed in the top channel 15 downstream of the fan 14. A vertical channel wall 8 disposed inside the oven has a plurality of openings 21 defined along the channel wall so that the heated air may be discharged from the chamber 19 into a vertical channel 16 that is in fluid communication with the top channel 15. The vertical channel 16 is disposed upstream of the top channel 15 and the fan 14. In operation, the fan 14 conveys a mixture of air and combustion gases received from the upstream vertical channel 16 to the heat-generating device 4. The heat-generating device 4 is elongate and extends in a direction that is perpendicular to the mixture of air and combustion gases that flows in the top channel 15 and into the vertical passageway 5. The air/gases then flow through the openings 17 and into the chamber 19 to heat the bread pieces 3 before the air/gases escape through the openings 21 into the vertical channel 16. The fan 14 then urges the air/gases toward the heater 4 to again increase the temperature of the air/gases. In this way, the air/gases are circulated within the top channel 15, passageway 5, and channel 16 and heated by the heater 4. The heated air circulates in the oven through a system of channels and openings, as the arrows show. The air thus flows from the burner 4 downward through the channel 5, from which it is distributed through openings (not shown) in the inner wall 6 of the channel. The openings in the wall are arranged so that a uniform flow is achieved in towards the food products to be processed. In the illustrated example, it is bread that is to be baked. The bread pieces 3 are placed on sheets 7 in a bread rack 2. The air flows through the bread rack 2 and onward through openings in the channel wall 8, from which it is led upward and is mixed with the combustion gases. The combustion gases contain air that is added for combustion.

The catalytic burner 4 is shown in greater detail in FIG. 2. It has a mainly cylindrical shape, although other shapes are possible, and its surface is coated with the catalytic material consisting of noble metals or metal oxides. The air-fuel mixture applied to the catalyzer reacts chemically with the catalyst material. Combustion is complete and, since the products of combustion consist solely of carbon dioxide and water, the process is environmentally friendly. Since the combustion occurs at a lower temperature than does combustion using a flame, the formation of poisonous nitrous oxides is avoided.

While the present invention has been described in accordance with preferred compositions and embodiments, it is to be understood that certain substitutions and alterations may be made thereto without departing from the spirit and scope of the following claims.

We claim:

1. An oven, comprising:

a top channel defined at a top portion of the oven;

a fan disposed in the top channel;

a heat generating device, disposed in the top channel downstream of the fan, for generating heat for processing a food product disposed in a chamber defined in the oven, the heat generated being transferred to the food product by convection, the heat generating device comprising a catalytic burner device adapted to effect all of the heat generation;

a first vertical passageway defined along a first side of the oven, the first vertical passageway being in fluid communication with the top channel;

an innerwall dividing the chamber from the first vertical passageway, the inner wall having a plurality of openings defined therein so that the heat from the heat generating device is discharged by convection into the chamber; and a second vertical Passageway defined along a second side of the oven that is the first side, the second vertical passageway being in fluid communication with the chamber and the top channel.

2. The oven according to claim 1 wherein the oven is a baking oven.

3. A method for generating heat for an oven for processing food products, comprising the steps of:

providing an oven having a top channel defined at a top portion of the oven and a catalytic combustion device being disposed in the top channel;

providing a first vertical passageway defined along a side of the oven, the first vertical passageway being in fluid communication with the top channel and providing an innerwall disposed inside the oven, the inner wall having a plurality of openings defined therein;

conducting air to the catalytic combustion device;

heating the air in the catalytic combustion device;

conducting the heated air into the first vertical passageway and into the chamber through the openings of the innerwall;

transferring the heated air from the first vertical passageway to the food products by convection; and passing the heated air to a second vertical passageway that is substantially parallel to the first vertical passageway and in communication with the top channel.

4. The method according to claim 3 wherein the method further comprises the step of recirculating oven air.

5. The method according to claim 3 wherein the step of processing comprises baking the food products.

6. A baking oven for processing food products disposed therein, comprising:

a rack device disposed inside the baking oven for supporting the food products placed on the rack device;

a channel defined in the baking oven adapted to carry an air-fuel mixture;

means forming a vertical passageway defined in the baking oven, the vertical passageway being in fluid communication with the channel;

a cylindrical shaped catalytic burner disposed inside the channel and attached to an upper end of the oven, the catalytic burner having an outer surface coated with a noble metal that is adapted to chemically react with an air-fuel mixture to provide hot gases by catalytic combustion; and said vertical passageway comprising an inner wall disposed inside the oven, the inner wall having a plurality of openings defined therein so that the rack device is in fluid communication with the vertical passageway, the plurality of openings being adapted to provided a uniform flow of the hot gases towards the food products means forming a second vertical passageway in the oven in communication with the channel and having openings so that hot gases after heating the food products can be recirculated back to the channel.

* * * * *